(12) United States Patent
Lan et al.

(10) Patent No.: US 10,884,448 B1
(45) Date of Patent: Jan. 5, 2021

(54) CLOCK GLITCH DETECTION CIRCUIT

(71) Applicant: Nuvoton Technology Corporation, Hsinchu (TW)

(72) Inventors: Yung-Chi Lan, Hsinchu (TW); Cheng-Chih Wang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 16/730,985

(22) Filed: Dec. 30, 2019

(30) Foreign Application Priority Data

Sep. 6, 2019 (TW) .............................. 108132223 A (51) Int. Cl.
*H03K 5/19* (2006.01)
*G06F 1/04* (2006.01)
*H04L 7/00* (2006.01)

(52) U.S. Cl.
CPC ................. *G06F 1/04* (2013.01); *H03K 5/19* (2013.01); *H04L 7/0008* (2013.01)

(58) Field of Classification Search
CPC .......... H03K 5/19; H03K 5/26; H03K 5/1534; H03K 5/1252; H03K 3/013; G06F 13/14; G06F 13/364; G06F 1/04; G11C 8/18; G01R 29/0273
See application file for complete search history.

(56) References Cited

U.S. PATENT DOCUMENTS

| | | | | |
|---|---|---|---|---|
| 3,735,271 A | * | 5/1973 | Leibowitz | .......... G01R 29/0273 327/36 |
| 5,708,375 A | * | 1/1998 | Lemmens | ............... G01R 23/15 327/20 |
| 6,745,337 B1 | | 6/2004 | Trivedi et al. | |
| 7,372,304 B2 | * | 5/2008 | Fruhauf | ........... G01R 31/31719 326/38 |
| 7,590,880 B1 | | 9/2009 | Hershman | |
| 7,679,404 B2 | | 3/2010 | Neidengard | |
| 8,552,764 B2 | | 10/2013 | Rohleder et al. | |
| 2003/0214772 A1 | | 11/2003 | Hugues et al. | |
| 2007/0075746 A1 | | 4/2007 | Fruhauf et al. | |

FOREIGN PATENT DOCUMENTS

TW 200735532 9/2007

* cited by examiner

*Primary Examiner* — Long Nguyen
(74) *Attorney, Agent, or Firm* — JCIPRNET (57) ABSTRACT

A clock glitch detection circuit includes a detection circuit and a logic circuit. The detection circuit is configured to receive a clock input signal and a clock output signal and determines whether the clock input signal and the clock output signal are in phase, so as to output a first detection signal and a second detection signal. The logic circuit is coupled to the detection circuit and configured to receive the first detection signal and the second detection signal. The logic circuit determines whether the first detection signal and the second detection signal are in phase, so as to generate a glitch detection signal. The glitch detection signal is configured to indicate whether clock glitch occurs in the clock input signal.

8 Claims, 6 Drawing Sheets

CLOCK GLITCH DETECTION CIRCUIT

CROSS-REFERENCE TO RELATED APPLICATION

This application claims the priority of Taiwan application serial no. 108132223, filed on Sep. 6, 2019. The entirety of the above-mentioned patent application is hereby incorporated by reference herein and made a part of this specification.

BACKGROUND

Technical Field

The disclosure relates to a glitch detection technology, and more particularly to a clock glitch detection circuit.

Description of Related Art

When a hacker attacks a secure chip or system, applying an appropriate clock glitch on an operation clock of the secure chip or system is one of the most commonly used methods.

The clock glitch is a clock signal whose width is less than a predetermined time. When the clock glitch occurs, the system cannot operate normally or may encounter operational errors, which may lead to abnormal processing on the secure chip or system. As a result, the hacker can obtain the access authority and relevant confidential information.

SUMMARY

The disclosure provides a clock glitch detection circuit that can detect a clock glitch and thus protect a chip or a system from being subject to attacks resulting from the clock glitch.

According to an embodiment, a clock glitch detection circuit including a detection circuit and a logic circuit is provided. The detection circuit is configured to receive a clock input signal and a clock output signal, and the detection circuit determines whether the clock input signal and the clock output signal are in phase to output a first detection signal and a second detection signal. The logic circuit is coupled to the detection circuit and configured to receive the first detection signal and the second detection signal, and the logic circuit determines whether the first detection signal and the second detection signal are in phase to generate a glitch detection signal. Here, the glitch detection signal is configured to indicate whether a clock glitch occurs in the clock input signal.

Based on the above, in the clock glitch detection circuit provided in one or more embodiments of the disclosure, it is determined whether the clock input signal and the clock output signal (which is the signal generated by filtering out the clock glitch in the clock input signal) are in phase, whereby the glitch detection signal configured to indicate that no clock glitch occurs in the clock input signal is generated, and the glitch detection signal can be applied to inform the system of whether there is a clock glitch. As a result, the chip or system can be protected from the clock glitch attacks.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
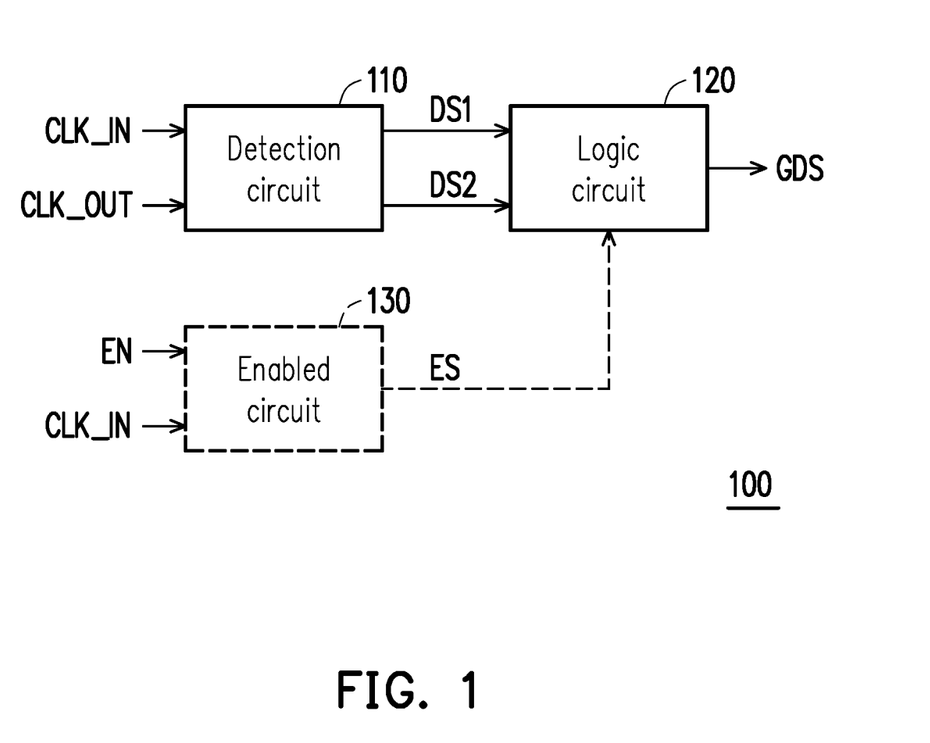
FIG. 1 is a block diagram illustrating a clock glitch detection circuit according to an embodiment of the disclosure.

FIG. 1 is a block diagram illustrating a clock glitch detection circuit according to an embodiment of the disclosure. With reference to FIG. 1, a clock glitch detection circuit 100 includes a detection circuit 110 and a logic circuit 120, and the logic circuit 120 is coupled to the detection circuit 110.

In an embodiment of the disclosure, the detection circuit 110 receives a clock input signal CLK_IN and the clock output signal CLK_OUT and determines whether the clock input signal CLK_IN and the clock output signal CLK_OUT are in phase, so as to output a detection signal DS1 and a detection signal DS2. The logic circuit 120 receives the detection signal DS1 and the detection signal DS2 and determines whether the detection signal DS1 and the detection signal DS2 are in phase, so as to generate a glitch detection signal GDS. In particular, the glitch detection signal GDS is configured to indicate whether a clock glitch occurs in the clock input signal CLK_IN.

Specifically, when the detection circuit 110 determines that the clock input signal CLK_IN and the clock output signal CLK_OUT are out of phase, in an embodiment, the detection circuit 110 enables one of the detection signal DS1 and the detection signal DS2 and disables the other of the detection signal DS1 and the detection signal DS2. Next, the logic circuit 120 determines that the detection signal DS1 and the detection signal DS2 are out of phase and generates the glitch detection signal GDS indicating that the clock glitch occurs in the clock input signal CLK_IN.

By contrast, when the detection circuit 110 determines that the clock input signal CLK_IN and the clock output signal CLK_OUT are in phase, in an embodiment, the detection circuit 110 simultaneously "enables" the detection signal DS1 and the detection signal DS2. In another embodiment, the detection circuit 110 simultaneously "disables" the detection signal DS1 and the detection signal DS2. Next, the logic circuit 120 determines that the detection signal DS1 and the detection signal DS2 are in phase and generates the glitch detection signal GDS indicating that no clock glitch occurs in the clock input signal CLK_IN. The embodiments disclosing that the detection circuit 110 simultaneously "enables" or "disables" the detection signal DS1 and the detection signal DS2 at the same time will be further described with reference to FIG. 2 to FIG. 4.

In another embodiment, the clock glitch detection circuit 100 further includes an enabled circuit 130, and the enabled circuit 130 is coupled to the logic circuit 120. The enabled circuit 130 receives an enabling signal EN and the clock input signal CLK_IN and determines whether the enabling signal EN is enabled and whether the clock input signal CLK_IN is an unknown signal, so as to output an enabled signal ES. And in the present embodiment, the logic circuit 120 receives the detection signal DS1, the detection signal DS2, and the enabled signal ES to generate the glitch detection signal GDS. In particular, in an embodiment, the enabling signal EN is, for instance, a power supply voltage level, which is not limited in the disclosure.

In detail, the enabled circuit 130 enables the enabled signal ES when the enabling signal EN is being enabled (logic 1) and the clock input signal CLK_IN is not the unknown signal. When the enabled signal ES is being enabled, the logic circuit 120 determines whether the detection signal DS1 and the detection signal DS2 are in phase to generate the glitch detection signal GDS. This determination method has been described in the foregoing paragraphs and will not be further explained hereinafter. By contrast, when the enabling signal EN is being disabled (logic 0) or the clock input signal CLK_IN is the unknown signal, the enabled circuit 130 disables the enabled signal ES, and when the enabled signal ES is being disabled, the logic circuit 120 generates the glitch detection signal GDS indicating that no clock glitch occurs in the clock input signal CLK_IN. Thereby, the clock glitch detection circuit 100 can utilize the enabled circuit 130 to prevent the clock glitch detection error which may occur when the clock input signal CLK_IN is the unknown signal.

Here, note that the clock output signal CLK_OUT is a signal generated by filtering out the clock glitch in the clock input signal CLK_IN. In an embodiment, the clock glitch detection circuit 100 further includes a clock filter circuit (not shown in FIG. 1), and the clock filter circuit is coupled to the detection circuit 110. The clock filter circuit receives the clock input signal CLK_IN and filters out the clock glitch in the clock input signal CLK_IN, so as to generate the clock output signal CLK_OUT. The clock filter circuit will be further explained with reference to FIG. 5.

Figure 2:
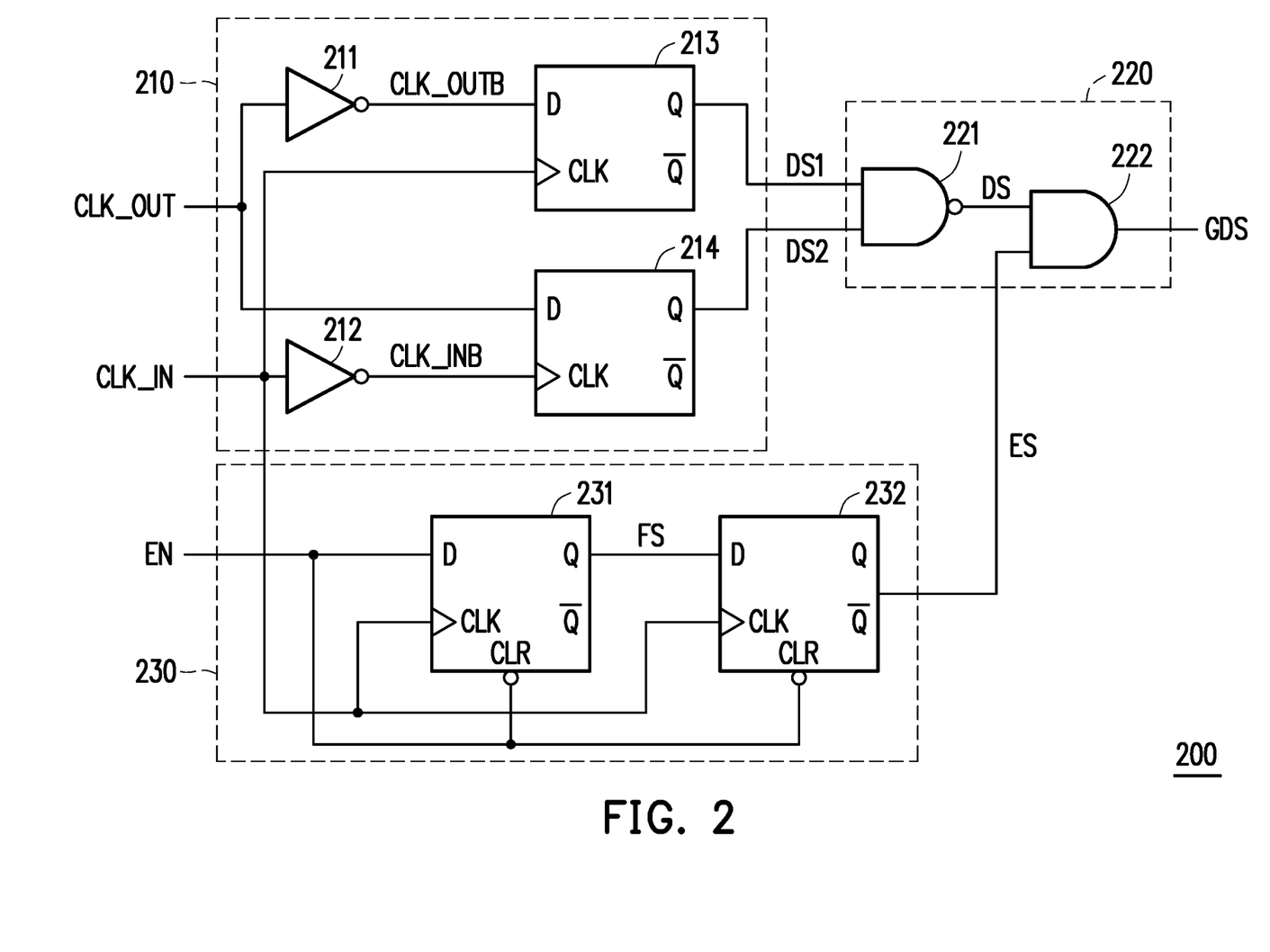
FIG. 2 is a circuit diagram illustrating a clock glitch detection circuit according to an embodiment of the disclosure.
Figure 3:
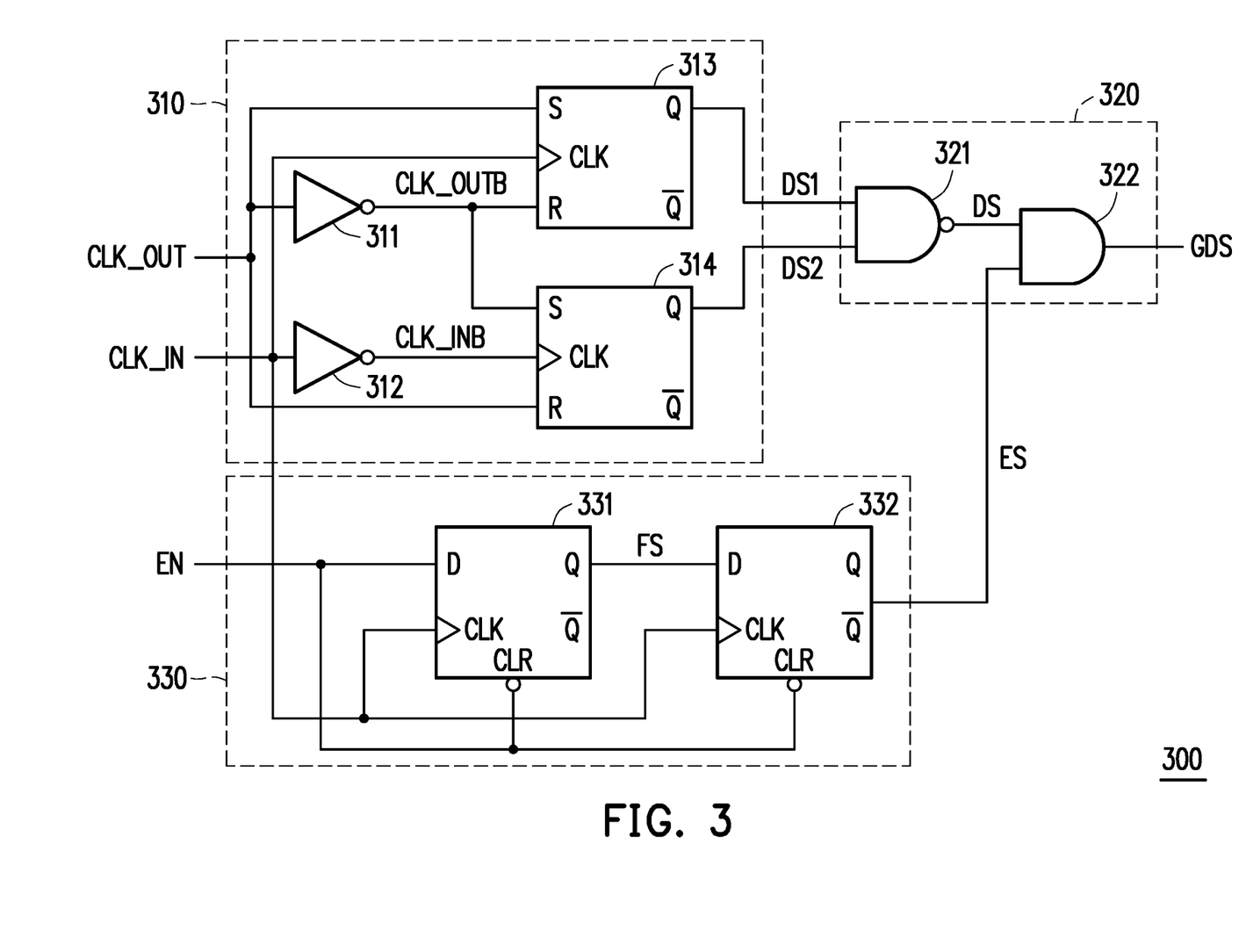
FIG. 3 is a circuit diagram illustrating a clock glitch detection circuit according to an embodiment of the disclosure.

FIG. 2 and FIG. 3 are circuitry diagrams illustrating that the detection circuit 110 "enables" the detection signal DS1 and the detection signal DS2 when the clock input signal CLK_IN and the clock output signal CLK_OUT are in phase.

FIG. 2 is a circuit diagram illustrating a clock glitch detection circuit according to an embodiment of the disclosure. With reference to FIG. 2, in an embodiment, the clock glitch detection circuit 200 includes a detection circuit 210 and a logic circuit 220, and the logic circuit 220 is coupled to the detection circuit 210.

The detection circuit 210 includes an inverter 211, an inverter 212, a D-type flip-flop 213, and a D-type flip-flop 214. The D-type flip-flop 213 is coupled to the inverter 211, and the D-type flip-flop 214 is coupled to the inverter 212. The inverter 211 receives the clock output signal CLK_OUT to output an inverted clock output signal CLK_OUTB. The inverter 212 receives the clock input signal CLK_IN to output an inverted clock input signal CLK_INB. A data input terminal (D) of the D-type flip-flop 213 receives the inverted clock output signal CLK_OUTB, and a clock input terminal (CLK) receives the clock input signal CLK_IN. A data output terminal (Q) of the D-type flip-flop 213 outputs the detection signal DS1. The data input terminal (D) of the D-type flip-flop 214 receives the clock output signal CLK_OUT, and a clock input terminal (CLK) receives the inverted clock input signal CLK_INB. A data output terminal (Q) of the D-type flip-flop 214 outputs the detection signal DS2.

The logic circuit 220 includes a NAND gate 221, and the NAND gate 221 receives the detection signal DS1 and the detection signal DS2 to output a determination signal DS (in this embodiment, the determination signal DS is the glitch detection signal GDS). That is, when the detection signal DS1 and the detection signal DS2 are both being enabled (logic 1), the glitch detection signal GDS indicates that no clock glitch occurs in the clock input signal CLK_IN, and when one of the detection signal DS1 and the detection signal DS2 is being disabled (logic 0), the glitch detection signal GDS indicates that the clock glitch occurs in the clock input signal CLK_IN.

In another embodiment, the clock glitch detection circuit 200 further includes an enabled circuit 230, and the enabled circuit 230 is coupled to the logic circuit 220.

The enabled circuit 230 includes a D-type flip-flop 231 and a D-type flip-flop 232, and the D-type flip-flop 232 is coupled to the D-type flip-flop 231. A data input terminal (D) of the D-type flip-flop 231 receives the enabling signal EN, a clock input terminal (CLK) receives the clock input signal CLK_IN, and a clear input terminal (CLR) receives an inverted enabling signal EN. A data output terminal (Q) of the D-type flip-flop 231 outputs a flip-flop output signal FS. A data input terminal (D) of the D-type flip-flop 232 receives the flip-flop output signal FS, a clock input terminal (CLK) receives the clock input signal CLK_IN, and a clear input terminal (CLR) receives the inverted enabling signal EN. A data output terminal (Q) of the D-type flip-flop 230 outputs the enabled signal ES.

The logic circuit 220 further includes an AND gate 222, and the AND gate 222 is coupled to the NAND gate 221. The AND gate 222 receives the determination signal DS and the enabled signal ES to output the glitch detection signal GDS. In other words, when one of the determination signal DS and the enabled signal ES is being disabled (logic 0), the glitch detection signal GDS indicates that no clock glitch occurs in the clock input signal CLK_IN, and when both the determination signal DS and the enabled signal ES are being enabled (logic 1), the glitch detection signal GDS indicates that the clock glitch occurs in the clock input signal CLK_IN.

FIG. 3 is a circuit diagram illustrating a clock glitch detection circuit according to an embodiment of the disclosure. With reference to FIG. 3, in an embodiment, a clock glitch detection circuit 300 includes a detection circuit 310 and a logic circuit 320, and the logic circuit 320 is coupled to the detection circuit 310.

The detection circuit 310 includes an inverter 311, an inverter 312, an SR-type flip-flop 313, and an SR-type flip-flop 314. The SR-type flip-flop 313 is coupled to the inverter 311, and the SR-type flip-flop 314 is coupled to the inverter 311 and the inverter 312. The inverter 311 receives clock output signal CLK_OUT to output the inverted clock output signal CLK_OUTB. The inverter 312 receives the clock input signal CLK_IN to output the inverted clock input signal CLK_INB. A data input terminal (S) of the SR-type flip-flop 313 receives the clock output signal CLK_OUT, a data output terminal (R) receives and outputs the inverted clock output signal CLK_OUTB, and a clock input terminal (CLK) receives the clock input signal CLK_IN. A data output terminal (Q) of the SR-type flip-flop 313 outputs the detection signal DS1. A data input terminal (S) of the SR-type flip-flop 314 receives the inverted clock output signal CLK_OUTB, a data output terminal (R) receives the clock output signal CLK_OUT, and a clock input terminal (CLK) receives the inverted clock input signal CLK_INB. A data output terminal (Q) of the SR-type flip-flop 314 outputs the detection signal DS2.

The logic circuit 320 includes an NAND gate 321, and the NAND gate 321 receives the detection signal DS1 and the detection signal DS2 to output the determination signal DS (in this embodiment, the determination signal DS is the glitch detection signal GDS). That is, when the detection signal DS1 and the detection signal DS2 are both being enabled (logic 1), the glitch detection signal GDS indicates that no clock glitch occurs in the clock input signal CLK_IN, and when one of the detection signal DS1 and the detection signal DS2 is being disabled (logic 0), the glitch detection signal GDS indicates that the clock glitch occurs in the clock input signal CLK_IN.

In an embodiment, the signals received by the data input terminals (S) of the SR-type flip-flop 313 and the SR-type flip-flop 314 are interchangeable with the signals received by the data output terminals (R).

In another embodiment, the clock glitch detection circuit 300 further includes an enabled circuit 330. The enabled circuit 330 includes a D-type flip-flop 331 and a D-type flip-flop 332, and the logic circuit 320 further includes an AND gate 322. It should be noted that the logic circuit 320 and the enabled circuit 330 shown in FIG. 3 are the same as the logic circuit 220 and the enabled circuit 230 shown in FIG. 2 and thus will not be further described hereinafter.

Figure 4:
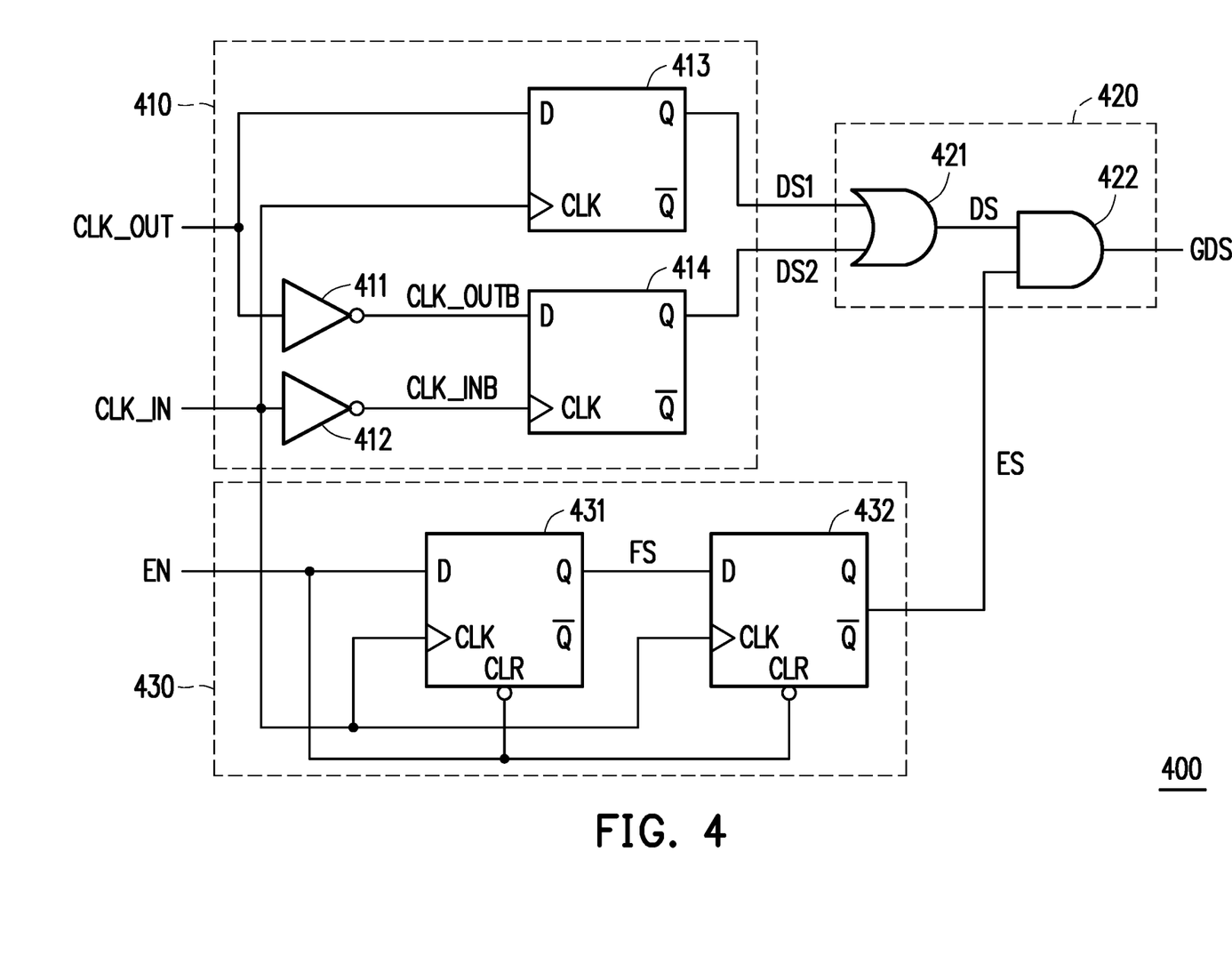
FIG. 4 is a circuit diagram illustrating a clock glitch detection circuit according to an embodiment of the disclosure.

FIG. 4 is a circuitry diagram illustrating that the detection circuit "disables" the detection signal DS1 and the detection signal DS2 when the clock input signal CLK_IN and the clock output signal CLK_OUT are in phase.

FIG. 4 is a circuit diagram illustrating a clock glitch detection circuit according to an embodiment of the disclosure. With reference to FIG. 4, in an embodiment, a clock glitch detection circuit 400 includes a detection circuit 410 and a logic circuit 420, and the logic circuit 420 is coupled to the detection circuit 410.

The detection circuit 410 includes an inverter 411, an inverter 412, a D-type flip-flop 413, and a D-type flip-flop 414. The D-type flip-flop 414 is coupled to the inverter 411 and the inverter 412. The inverter 411 receives the clock output signal CLK_OUT to output the inverted clock output signal CLK_OUTB. The inverter 412 receives the clock input signal CLK_IN to output the inverted clock input signal CLK_INB. A data input terminal (D) of the D-type flip-flop 413 receives the clock output signal CLK_OUT, and a clock input terminal (CLK) receives the clock input signal CLK_IN. A data output terminal (Q) of the D-type flip-flop 413 outputs the detection signal DS1. A data input terminal (D) of the D-type flip-flop 414 receives the inverted clock output signal CLK_OUTB, and a clock input terminal (CLK) receives the inverted clock input signal CLK_INB. A data output terminal (Q) of the D-type flip-flop 414 outputs the detection signal DS2.

The logic circuit 420 includes an OR gate 421, and the OR-gate 421 receives the detection signal DS1 and the detection signal DS2 to output the determination signal DS (in this embodiment, the determination signal DS is the glitch detection signal GDS). That is to say, when both the detection signal DS1 and the detection signal DS2 are being disabled (logic 0), the glitch detection signal GDS indicates that no clock glitch occurs in the clock input signal CLK_IN, and when one of the detection signal DS1 and the detection signal DS2 is being enabled (logic 1), the glitch detection signal GDS indicates that the clock glitch occurs in the clock input signal CLK_IN.

In another embodiment, the clock glitch detection circuit 400 further includes an enabled circuit 430. The enabled circuit 430 includes a D-type flip-flop 4331 and a D-type flip-flop 432, and the logic circuit 420 further includes the OR gate 422. It should be noted here that the enabled circuit 430 shown in FIG. 4 is the same as the enabled circuit 230 shown in FIG. 2, and the action of the OR gate 422 in the logic circuit 420 is similar to the action of the AND gate 222 in the logic circuit 220; hence, no further description is given hereinafter.

Figure 5:
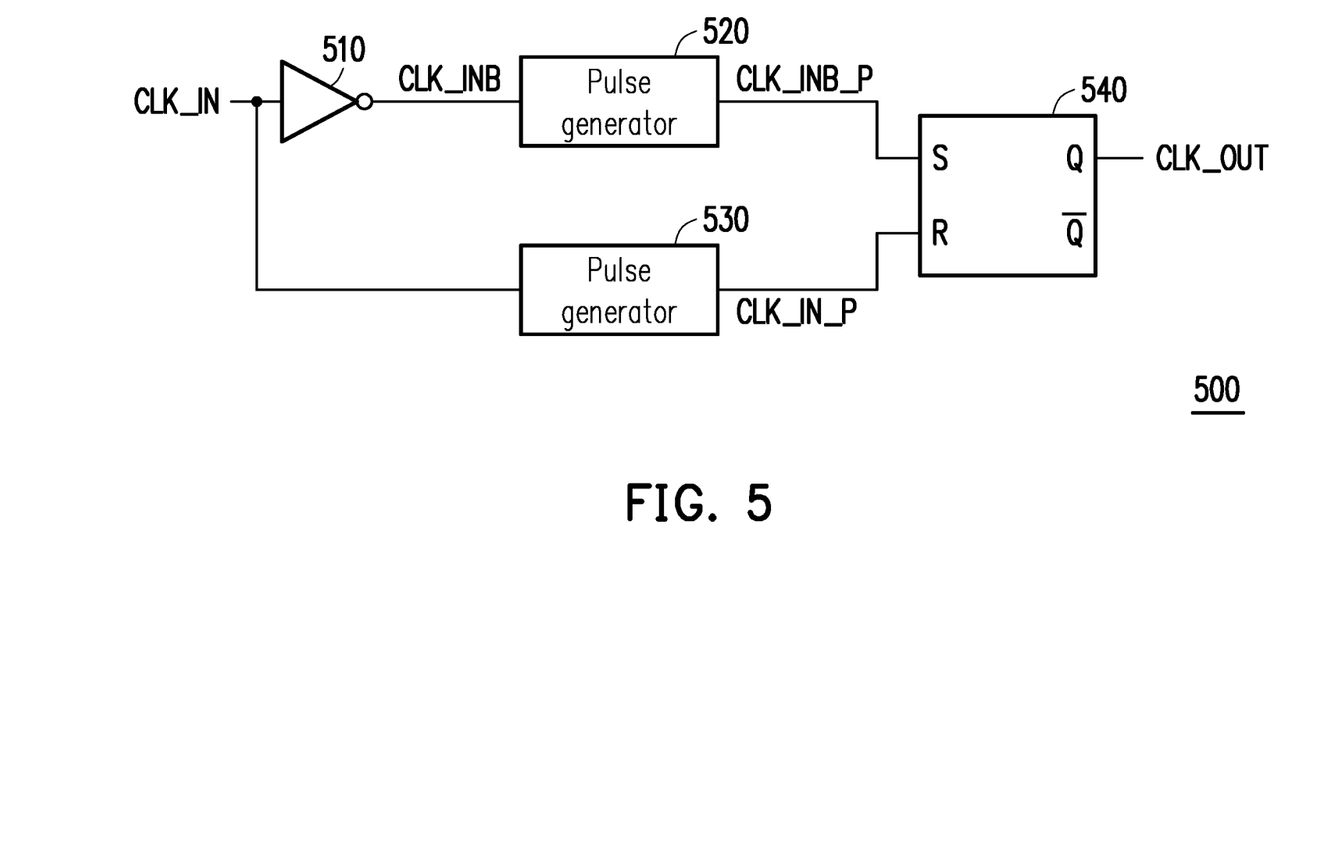
FIG. 5 is a circuit diagram illustrating a clock filter circuit according to an embodiment of the disclosure.

FIG. 5 is a circuit diagram illustrating a clock filter circuit according to an embodiment of the disclosure. With reference to FIG. 5, a clock filter circuit 500 includes an inverter 510, a pulse generator 520, a pulse generator 530, and an SR-type flip-flop 540. The pulse generator 520 is coupled to the inverter 510, and the SR-type flip-flop 540 is coupled to the pulse generator 520 and the pulse generator 530. The inverter 510 receives the clock input signal CLK_IN to output the inverted clock input signal CLK_INB. The pulse generator 520 receives the inverted clock input signal CLK_INB and outputs a pulse signal CLK_INB_P. The pulse generator 530 receives the clock input signal CLK_IN and outputs a pulse signal CLK_IN_P. A data input terminal (S) of the SR-type flip-flop 540 receives the pulse signal CLK_INB_P, and a data output terminal (R) receives the pulse signal CLK_IN_P and outputs the clock output signal CLK_OUT.

In an embodiment, the signal received by the data input terminal (S) of the SR-type flip-flop 540 is interchangeable with the signal received by the data output terminal (R).

Figure 6:
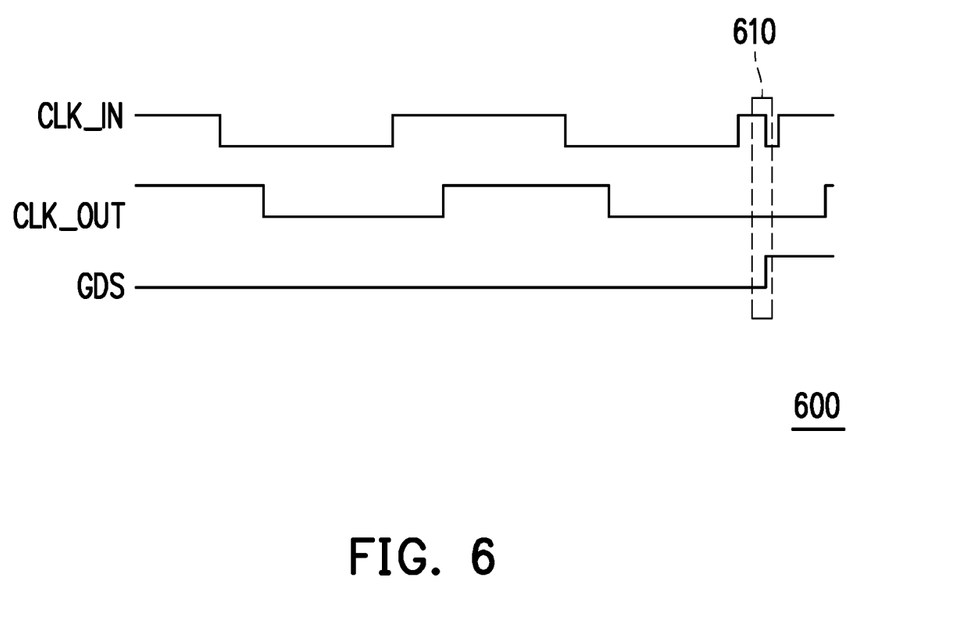
FIG. 6 is a simulated waveform diagram of a clock glitch detection circuit according to an embodiment of the disclosure.

FIG. 6 is a simulated waveform diagram of a clock glitch detection circuit according to an embodiment of the disclosure. With reference to FIG. 6, FIG. 6 shows a waveform 600 of the clock input signal CLK_IN, the clock output signal CLK_OUT, and the glitch detection signal GDS. FIG. 6 is a simulated waveform diagram of the clock glitch detection circuit 200 provided in the embodiment shown in FIG. 2. Due to the circuitry structure of the pulse generator 520 and the pulse generator 530 shown in FIG. 5, there is a delay time between the clock input signal CLK_IN and the clock output signal CLK_OUT of the clock filter circuit 500. In an embodiment, the length of the delay time may be associated with the circuitry structure of the pulse generator 520 and the pulse generator 530, which should not be construed as a limitation in the disclosure. When there is a phase change to the clock input signal CLK_IN, the clock glitch detection circuit 200 determines whether the clock glitch occurs in the clock input signal CLK_IN according to the level of the clock output signal CLK_OUT. Note that the clock glitch detection circuit 200 sets the basis for the determination according to the delay time. In the embodiment shown in FIG. 6, since the delay time is less than half a cycle, and therefore when the level of the clock input signal CLK_IN is changed from high to low, the clock glitch detection circuit 200 determines whether the clock output signal CLK_OUT is at a high level. If the clock glitch detection circuit 200 determines that the clock output signal CLK_OUT is at the high level, it indicates that no clock glitch occurs. If the clock output signal CLK_OUT is at the low level, it indicates that the clock glitch occurs. When the level of the clock input signal CLK_IN level is changed from from low to high, the clock glitch detection circuit 200 determines whether the clock output signal CLK_OUT is at a low level. If the clock glitch detection circuit 200 determines that the clock output signal CLK_OUT is at the low level, it indicates that no clock glitch occurs. If the clock output signal CLK_OUT is at the high level, it indicates that the clock glitch occurs. It should be mentioned that the clock glitch detection circuit 200 sets the basis for the determination according to the delay time which is less than half a cycle, which should however not be construed as a limitation in the disclosure.

In a square box 610 with middle dashed borders in the waveform 600, the level of the clock input signal CLK_IN is changed from high to low, and the clock output signal CLK_OUT is at the low level; hence, the clock glitch occurs in the clock input signal CLK_IN and is filtered output by the clock filter circuit 500, so as to generate the clock output signal CLK_OUT. The clock input signal CLK_IN and the clock output signal CLK_OUT are received by the detection circuit 210 and the logic circuit 220, so as to generate the glitch detection signal GDS that detects the occurrence of the clock glitch in the clock input signal CLK_IN. Accordingly, the clock glitch detection circuit can suppress the clock glitch and also perform the function of detecting the clock glitch (through outputting the glitch detection signal GDS to notify the system of whether there is any occurrence of the clock glitch in the clock input signal CLK_IN).

To sum up, in the clock glitch detection circuit provided by one or more embodiments of the disclosure, the detection circuit receives the clock input signal and the clock output signal (generated by filtering out the clock glitch in the clock input signal), and when the detection circuit determines that the clock input signal and the clock output signal are in phase, a set of detection signals in phase is output. The logic circuit then receives the set of in-phase detection signals and generates the glitch detection signal configured to indicate that no clock glitch occurs in the clock input signal. When the detection circuit determines that the clock input signal and the clock output signal are out of phase, a set of inverted detection signals is output, and the logic circuit receives the set of inverted detection signals and generates the glitch detection signal configured to indicate that the clock glitch occurs in the clock input signal. As such, the glitch detection signal is applied to notify the system of whether there is an occurrence of the clock glitch. Thereby, the chip or system can be protected from the clock glitch attacks.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A clock glitch detection circuit comprising:
   a detection circuit configured to receive a clock input signal and a clock output signal, the detection circuit determining whether the clock input signal and the clock output signal are in phase, so as to output a first detection signal and a second detection signal; and
   a logic circuit coupled to the detection circuit and configured to receive the first detection signal and the second detection signal, the logic circuit determining whether the first detection signal and the second detection signal are in phase, so as to generate a glitch detection signal, wherein the glitch detection signal is configured to indicate whether a clock glitch occurs in the clock input signal,
   wherein when the clock input signal and the clock output signal are in phase, the detection circuit enables the first detection signal and the second detection signal, the logic circuit determines that the first detection signal and the second detection signal are in phase to generate the glitch detection signal, and the glitch detection signal indicates that no clock glitch occurs in the clock input signal.

2. The clock glitch detection circuit according to claim 1, wherein
   when the clock input signal and the clock output signal are out of phase, the detection circuit enables one of the first detection signal and the second detection signal and disables the other of the first detection signal and the second detection signal, the logic circuit determines that the first detection signal and the second detection signal are out of phase to generate the glitch detection signal, and the glitch detection signal indicates that the clock glitch occurs in the clock input signal.

3. The clock glitch detection circuit according to claim 2, wherein the logic circuit comprises an NAND gate, when the first detection signal and the second detection signal are both being enabled, the glitch detection signal indicates that no clock glitch occurs in the clock input signal, and when one of the first detection signal and the second detection signal is disabled, the glitch detection signal indicates that the clock glitch occurs in the clock input signal.

4. The clock glitch detection circuit according to claim 3, wherein the detection circuit comprises:
   a first inverter configured to receive the clock output signal to output an inverted clock output signal;
   a second inverter configured to receive the clock input signal to output an inverted clock input signal;
   a first flip-flop coupled to the first inverter and configured to receive the inverted clock output signal and the clock input signal to output the first detection signal; and
   a second flip-flop coupled to the second inverter and configured to receive the inverted clock input signal and the clock output signal to output the second detection signal.

5. The clock glitch detection circuit according to claim 3, wherein the detection circuit comprises:
   a first inverter configured to receive the clock output signal to output an inverted clock output signal;
   a second inverter configured to receive the clock input signal to output inverted clock input signal;
   a first flip-flop coupled to the first inverter and configured to receive the clock output signal, the inverted clock output signal, and the clock input signal, so as to output the first detection signal; and
   a second flip-flop coupled to the first inverter and the second inverter and configured to receive the inverted clock output signal, the clock output signal, and the inverted clock input signal, so as to output the second detection signal.

6. The clock glitch detection circuit according to claim 1, further comprising:
   an enabled circuit coupled to the logic circuit and configured to receive an enabling signal and the clock input signal, wherein the enabled circuit determines whether the enabling signal is enabled and whether the clock input signal is an unknown signal, so as to output an enabled signal, and the logic circuit receives the first detection signal, the second detection signal, and the enabled signal to generate the glitch detection signal.

7. The clock glitch detection circuit according to claim 1, further comprising:

a clock filter circuit coupled to the detection circuit and configured to receive the clock input signal and filter out the clock glitch in the clock input signal, so as to generate the clock output signal.

8. The clock glitch detection circuit according to claim 7, wherein the clock filter circuit comprises:
  a third inverter configured to receive the clock input signal to output an inverted clock input signal,
  a first pulse generator coupled to the third inverter and configured to receive the inverted clock input signal to output a first pulse signal,
  a second pulse generator configured to receive the clock input signal to output a second pulse signal, and
  a fifth flip-flop coupled to the first pulse generator and the second pulse generator and configured to receive the first pulse signal and the second pulse signal to output the clock output signal.

* * * * *